Aug. 25, 1964   G. B. FARKAS ETAL   3,145,680
TRANSPORT OF LIQUEFIED GASES
Filed Feb. 24, 1961
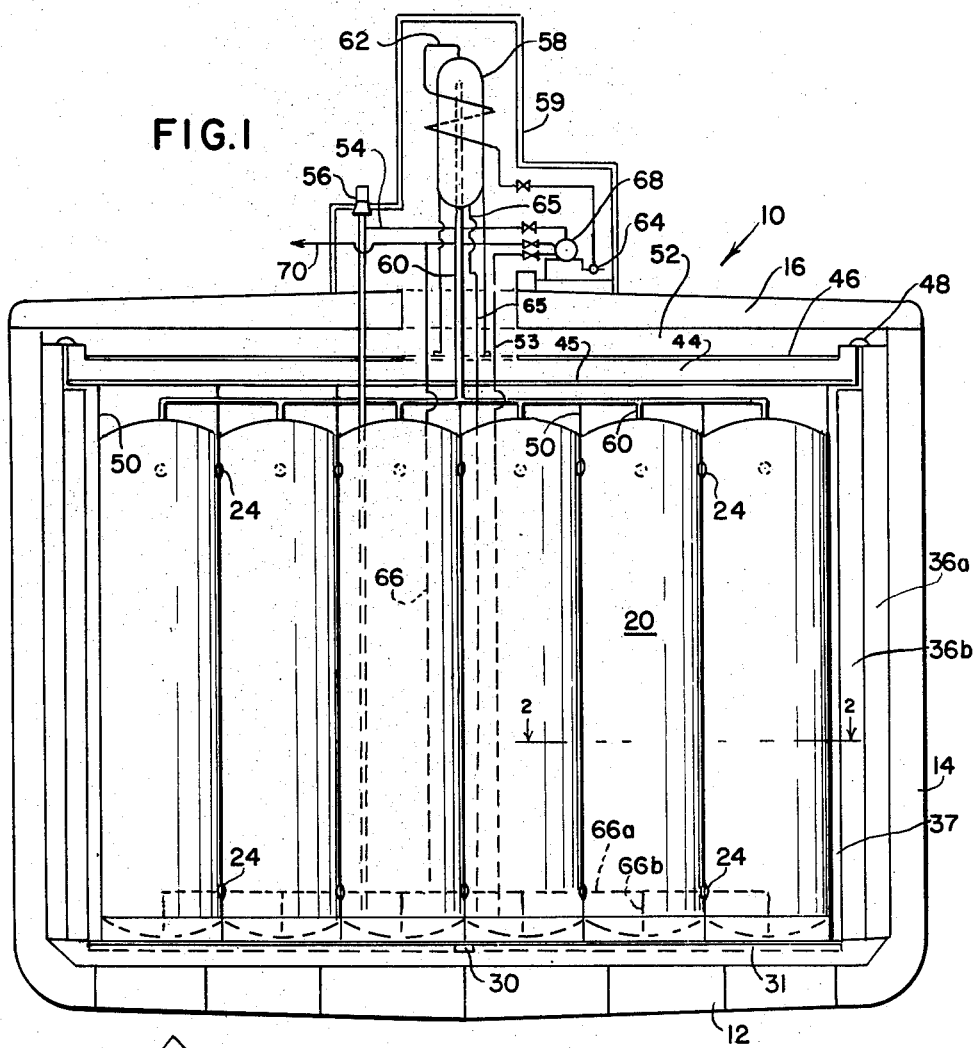
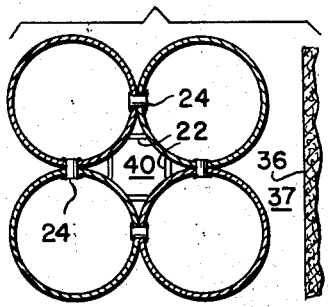
FIG. 2
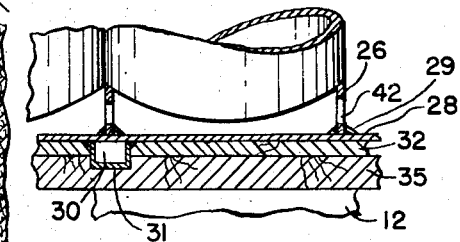
FIG. 3
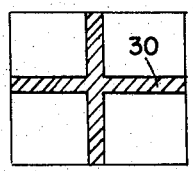
FIG. 4
INVENTORS
George B. Farkas,
Andrew D. Korin,
John D. Milligan.
BY Nathaniel Ely
ATTORNEY

United States Patent Office 3,145,680
Patented Aug. 25, 1964

3,145,680
TRANSPORT OF LIQUEFIED GASES
George B. Farkas, Jackson Heights, N.Y., and Andrew D. Korin, Oakland, and John D. Milligan, Little Silver, N.J., assignors to Hydrocarbon Research, Inc., New York, N.Y., a corporation of New Jersey
Filed Feb. 24, 1961, Ser. No. 91,506
1 Claim. (Cl. 114—74)

This invention relates to improvements in the transportation of liquefied gases at temperatures below about −40° F. and more particularly to the construction of shipping containers which may be transported by suitable vehicles such as a ship or barge.

The liquefaction of natural gas and its shipment at temperatures in the order of about −260° F. and at substantially atmospheric pressure by means of ocean going vessels has been demonstrated. It has been found that such transportation, while technically possible, has numerous technical problems which relate to the vehicle construction and insulation to minimize heat infiltration and to minimize cost of construction and maintenance. Ocean going vessels especially have unusual problems due to the turbulence of the sea which tends to cause liquid sloshing in tanks and increase vaporization of the liquid. As such vapors, in the case of natural gas, are hazardous, considerable care must be used to control such vapors as by re-liquefaction or by use as fuel. Both steps, of course, increase the cost of delivery either in reduction of the net delivered load of cargo or in an increase of cost of equipment.

Our invention concerns an improvement in the known constructions of tankage and vehicles, particularly seagoing, for the transportation of liquefied gases, such as liquefied natural gas, not only for the main purpose of reducing initial capital costs of equipment but to reduce in-transit losses or costs of shipment.

More specifically, our invention concerns the arrangement of tanks for transportation of liquefied normally gaseous materials wherein cylindrical tanks of a predetermined diameter within a comparatively narrow range are used to permit shop fabrication, facilitate ease of assembly, and provide for complete inspection and repair when the tanks are assembled into clusters or nests.

A still further object of our invention is to provide an improved thermally insulated hold or chamber for receiving liquid storage tanks which hold or chamber is intended for extended transportation through areas of relatively warm ambient temperatures and under conditions which normally cause vaporization of the liquid, such improved hold or chamber being adapted to materially curtail heat infiltration to thus reduce vaporization of the liquid.

A still further object of our invention is the provision of intercommunication of liquid through the tank walls to avoid the need for excessive overhead piping.

Further objects and advantages of our invention will appear from the following description of a preferred form of embodiment thereof when taken with the drawings attached which are illustrative of such form of embodiment and in which:

FIGURE 1 is a schematic substantially central transverse section through a vessel, such as a ship, showing a hold containing a nest of individual liquid storage tanks.

FIGURE 2 is a partial horizontal view taken substantially along the line 2—2 of FIGURE 1.

FIGURE 3 is a detailed elevation, with parts in section taken at the bottom of the tank nest.

FIGURE 4 is a reduced scale top plan view of the bottom of a hold.

As shown in FIGURE 1, the marine vessel 10 has a bottom 12, sides 14 and a top deck 16. It will also have transverse bulkheads which thus form a hold or chamber. While only a single hold is shown in a single deck vessel, a typical vessel will normally have a plurality of such holds, not only fore and aft, but they may be between decks if a multiple deck vessel is used.

Within this defined hold or chamber, we mount a nest of unit containers or tanks 20 which are preferably cylindrical and welded together as with ties 22 near the tangential portions to hold the tanks in contact one with another. These tanks, as hereinafter explained, are preferably of from six to fourteen feet in diameter and conveniently extend the full height of a typical hold, such as about forty-four feet. They are in liquid communication one with another through nozzles 24.

The base of the tanks 20 are dished for ease in filling and discharging and thus the lower portions of the tanks are provided with skirt portions 26 which permit mounting of the tanks on the floor plate 28. These skirt portions 26 are suitably welded as at 29 to the plate 28 which extends across the entire hold and further integrates the entire nest of tanks into a common unit.

The plate 28 is preferably made of the same material as the tanks, or a material having the same rate of expansion, so that the entire nest of tanks is free to expand or contract uniformly about its center. Conveniently the plate 28 has a centering piece 30 of cruciform shape which extends into a similarly shaped recess 31 in the supporting planking 32 which is mounted on the insulation 35. This insulation is preferably of balsa wood which in turn is carried on the inner surfaces of the ship bottom 12.

As shown in FIGURES 1 and 2, the insulation for the side wall of the hull is preferably in two layers the outer layer of which is a semi-fixed and bonded layer 36a which may consist of one or more layers of foam glass or cork or other pre-shaped insulation. This layer can be mounted in permanent array as by the use of suitable binders against the hull wall 14. With its cellular structure, gas circulation within the insulation 36a is substantially zero and cold spots on the hull wall are thereby prevented. Such insulation proves to be most effective in reducing heat infiltration down to about −200° F.

We have also found it desirable to line this fixed insulation 36a with one or more rows of a semi-fixed granular or fibrous secondary insulation 36b which may be of rockwool packed in bags of a suitable dimension. The bags themselves are preferably of impervious material which serves to decrease gas currents.

The secondary insulation is appropriately held in place to leave a space between the insulation and the tanks as generally designated at 37 which can be used for the access space to permit an inspection or repair of the outside of the tanks 20. This space 37 also becomes an important insulator for the very cold surfaces of the tanks 20.

As more particularly shown in FIGURE 2, the use of cylindrical tanks, secured on square pitch, forms an intermediate space 40 between the tanks. With tanks of at least six, and preferably eight feet or more in diameter, this space is sufficient for access by an inspector or repairman. It is thus possible to have complete external inspection of each of the tanks in the tank nest. Inspection of the dished bottom heads is accomplished through suitable inspection openings 42 in the supporting skirts 26. Hatches, not shown, will permit internal inspection of the tanks in the usual manner.

A nest of tanks preferably includes four and as many as forty-nine tanks depending on the size of the hold and the optimum tank size to obtain the greatest use of the available space. Usually the individual tanks are not greater than about fourteen feet in diameter which is about the largest that can be shop fabricated and transported to the ship assembly point.

The top of the hold is completed by a hatch cover 44 which may be made largely of cork or styrofoam or other suitable insulation. It will be provided with an aluminum sealing plate 45 to support the insulation and a flooring 46, as of wood, may be laid on the insulation. The hatch is suitably sealed at 48 to the insulation 36a on the sides of the hold. The hatch cover which is removable for access to the tanks, is supported from the tanks 20 through the upwardly projecting skirts 50. It is spaced sufficiently below the deck 16 to provide a crawl space 52.

With the nozzles 24 between the tanks providing for free flow of fluid between the tanks in a nest, and the common mounting of all of the tanks in a nest on a single plate, it is possible to have but a single liquid fill line 53 and a single discharge line 54 from pump 56, each line being connected to common header 68. These lines do not require expansion joints and materially simplify the piping.

For all of the respective tank nests, a common surge tank 58, surrounded by insulated housing 59 is used to take care of vaporization or expansion from the individual tanks through line 60. It is desirable to maintain the surge tank partially full of liquid to assure that all of the tanks are completely full and to thus reduce any sloshing of liquid during the voyage.

Vapors removed from the top of surge tank 58 may be removed through a coil 62 surrounding the surge tank and by discharging said vapors to header 64 either to fuel or to re-refrigeration units, some of the vapors in the surge tank will be re-condensed. Condensate is returned from surge tank 58 to the bottom of the tanks 20 through line 65. The tanks are also provided with an emergency methane and water removal or dump line 66 connected to header 68 and water discharge line 70.

It will be apparent from the foregoing description that we have provided an improved mobile container for transporting liquefied normally gaseous material in a nest of individual containers which can be maintained full and in intimate heat exchange contact to assure the minimum of vaporization. The independent insulation of the hold not only reduces heat infiltration but is especially arranged to prevent cold spots on the wall of the carrying container. Such a construction is thus especially advantageous for ship transportation of liquid natural gas.

The individual tanks have a high factor of amount of liquid carried for the total weight of the tanks, and considering the need for full tank wall inspection, also give a high proportion of total load carried for the amount of vessel space occupied. They are also easier to fabricate and install than tanks of other shapes. Inasmuch as in a tanker the function of space utilization is highly important, we have provided a very effective tankage. As heretofore noted, there is also considerable saving in piping by the nested assembly of individual tanks on the common support.

We are aware that modifications may be made to our invention and we therefore desire a broad interpretation of our invention within the scope and spirit of the description herein and the claim appended hereinafter.

We claim:

In combination with a tanker for transporting liquefied gases at temperatures below —40° F. wherein the tanker has a hull structure, walls in said hull structure forming holds, and heat insulating material on the inside of some of said walls, the improvement in a liquid containing assembly adapted to be mounted in at least one of said holds, which assembly comprises a nest of at least four vertical cylindrical containers, each having a diameter of between six and fourteen feet, said nest of containers being mounted on square pitch with the walls of the containers in contact, means to secure said containers one to another, a common supporting means to support the nest of containers, said containers having nozzles interconnected through the walls thereof in the areas of contact, said liquid containing assembly being spaced from the insulation on the wall of the hold to permit inspection of the external surfaces of the containers, the space in the area between the containers forming an access space for an inspector.

References Cited in the file of this patent

UNITED STATES PATENTS

| | | |
|---|---|---|
| 2,290,038 | Folmsbee | July 14, 1942 |
| 2,317,064 | Josephian | Apr. 20, 1943 |
| 2,341,044 | Jackson | Feb. 8, 1944 |
| 2,537,085 | Phelps | Jan. 9, 1951 |
| 2,600,015 | McLaughlin | June 10, 1952 |
| 2,687,618 | Bergstrom | Aug. 31, 1954 |
| 2,721,529 | Jahnsen | Oct. 25, 1955 |
| 2,725,027 | Brandon | Nov. 29, 1955 |
| 2,810,265 | Beckwith | Oct. 22, 1957 |
| 2,859,895 | Beckwith | Nov. 11, 1958 |
| 2,896,416 | Henry | July 28, 1959 |
| 2,897,657 | Rupp | Aug. 4, 1959 |
| 2,986,011 | Murphy | May 30, 1961 |
| 3,064,612 | Gardner et al. | Nov. 20, 1962 |

FOREIGN PATENTS

| | | |
|---|---|---|
| 1,067,327 | Germany | Oct. 15, 1959 |
| 667,215 | Great Britain | Feb. 27, 1952 |